United States Patent [19]

Warren

[11] Patent Number: 4,668,345
[45] Date of Patent: May 26, 1987

[54] DESALINATION APPARATUS AND METHOD FOR RECOVERING FRESH WATER

[76] Inventor: Thomas B. Warren, 1602 W. Summerdale Ave., Chicago, Ill. 60640

[21] Appl. No.: 705,630

[22] Filed: Feb. 26, 1985

[51] Int. Cl.$^4$ .............................................. B01D 3/02
[52] U.S. Cl. ........................................ 202/182; 159/5; 159/24 B; 202/235; 202/236; 203/24; 203/25; 203/89; 203/DIG. 17
[58] Field of Search .................... 203/DIG. 17, 10, 11, 203/21, 24, 26, 89, 91, 99, DIG. 24, DIG. 14; 202/163, 182, 232–236; 159/5, 49, DIG. 30, DIG. 32, 24 B

[56] References Cited

U.S. PATENT DOCUMENTS 718,209  1/1903  Kirkaldy ..................... 203/DIG. 17
2,388,599  11/1945  Cleaver et al. ............. 203/DIG. 17

Primary Examiner—Frank Sever

[57] ABSTRACT

Desalination apparatus comprising a vessel, an evaporation surface for receiving saline water in the vessel, a condensation chamber arranged in the vessel beneath the evaporation surface, an evaporation chamber arranged in the vessel above the evaporation surface, a fresh water tank for containing a reservoir of fresh water and fresh water vapor thereabove, a first conduit connecting the fresh water tank and the condensation chamber, a pump for compressing in the condensation chamber fresh water and fresh water vapor to maintain a pressure-temperature differential between the condensation chamber and the evaporation chamber at the evaporation surface, a second conduit connecting the evaporation chamber and the fresh water tank for removal of fresh water vapor from the evaporation chamber and its delivery to the reservoir of fresh water, and valves and conduits for conveying saline water to the evaporation surface and for taking off fresh water accumulated in the fresh water tank. The invention also includes a process for converting saline water to fresh water by compressing fresh water vapor in a condensation chamber to create a pressure-temperature differential between the condensation chamber and an evaporation surface arranged above that chamber, by vaporizing fresh water droplets separating from the saline water in an evaporation chamber arranged above the evaporation surface, and by transferring the fresh water droplets to a fresh water reservoir in a fresh water tank.

3 Claims, 1 Drawing Figure

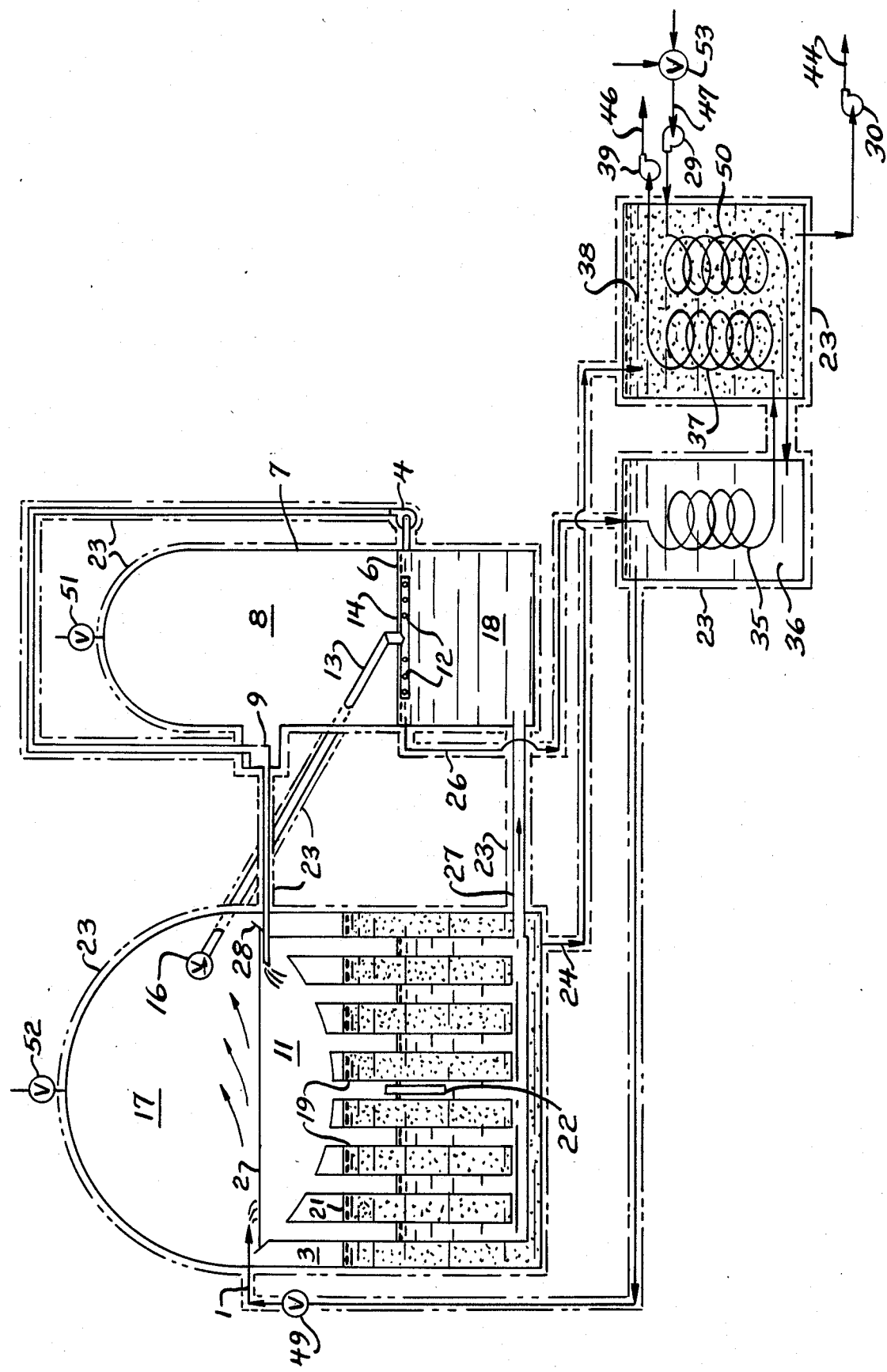

DESALINATION APPARATUS AND METHOD FOR RECOVERING FRESH WATER

BACKGROUND AND SUMMARY OF THE INVENTION

This invention relates to apparatus for the conversion of salt water to fresh water and to a method for performing such conversion.

Many suggestions have been made for the desalination of salt water, such as the use of solar stills, multiple effect distillations, flash distillations, freezing, vapor compression and others, but few of these proposals have proved to be practical, primarily because of the high energy cost in performing the process or the high cost for the equipment or the inefficiency of the proposed method or apparatus.

In the present invention, saline water is heated on an evaporation surface and the water vapor is moved by means of a fresh water stream. This system includes an evaporation tank and a fresh water tank. Fresh water and water vapor is pumped from the fresh water tank into a condensation chamber in the evaporation tank, increasing pressure and temperature to cause a film of salt water arranged thereabove on an evaporation surface to vaporize, and leaving salts and other impurities on the evaporation surface for flushing therefrom. The fresh water flow is returned to the fresh water tank.

The condensation chamber is arranged in the evaporation tank below the evaporation surface. The evaporation surface has maximum surface area in contact with the feed water delivered to it. The fresh water stream entrains vapor and routes this entrained fresh water—vapor stream into the condensing chamber, where, upon condensation, the heat of vaporization passes through the upper wall of the condensation chamber at or close to the evaporation surface, transfering its heat to vaporize the saline water passing onto the evaporation surface.

An outlet in the condensation chamber directs fresh water and distillate to the fresh water tank. The system also includes means for purging salt and other impurities left in the concentrated salt water at the evaporation surface during the vaporization process, as well as heat transfer means for conserving energy in the system. Preferably, the tanks, conduit and pumps are well insulated to prevent unintended loss of heat. Also, preferably, the system is relatively compact, as to permit the process to be performed with portable equipment, such as could be mounted on a flat bed trailer.

Once the system is brought to temperature and evaporization—vaporization begins, through the use of valves and conduits, and directing of the flow by means of one or more pumps, the process can be performed continuously, and fresh water may be taken off regularly. Depending upon the balancing of flow and the amount of water desired to be processed, the system may be tuned to accommodate the requirements for fresh water.

OBJECTS AND ADVANTAGES OF THE INVENTION

It is the object of the present invention to provide desalination apparatus and a method for recovering fresh water of the character described.

Another object of the present invention is to provide apparatus and a method whereby distillation and evaporation of saline water to fresh water may be accomplished under conditions of reduced pressure and temperature in one area and increased pressure and temperature in another area of the system.

Another object of the invention is to provide means for transporting vapor created from saline water by means of a fresh water stream.

Another object is to provide a novel evaporation chamber where saline water may be deposited onto a heated surface and vaporized.

Another object is to provide a distillation system utilizing a fresh water tank and a saline water tank, with an evaporation chamber arranged in the saline water tank, and conduits connecting said tanks, to maximize heat exchange between distillate and feed water.

Another object is to desalinate salt water by vaporization in a continuous system, removing treated fresh water product and saline effluent as needed, and replenishing salt water.

Another object is to provide desalination apparatus and a method which is compact, efficient, and easy to maintain and operate, without excessive energy demands.

These and other objects and advantages of the apparatus and method will become apparent as this description proceeds, taken in conjunction with the accompanying drawings.

BRIEF DESCRIPTION OF THE DRAWINGS

The accompanying drawing comprise a schematic view of the system, in which numbers set out in the following description correspond to like parts shown in the drawings.

DESCRIPTION OF A PREFERRED EMBODIMENT

With reference to the accompanying drawings, saline water inlet conduit 1 deposits salt water onto an evaporation surface 2, preferably a corrugated metal plate able to accommodate a shallow body or film of water in maximum contact with its surface, so that vapor will rise from the evaporation surface under effects of temperature and pressure differential, and excess salt water flows over the edges of the evaporation surface 2 into area 3 of chamber 21. Pump 4 delivers fresh water from just below the water level 6 in a fresh water tank 7 and the pump creates a low pressure vapor area 8 in said fresh water tank. The fresh water absorbs vapor at inlet 9, and this water, which is heated in a manner hereinafter described, is delivered into the condensation chamber 11 of the saline tank, heating the undersurface of the evaporation surface 2. It is the combination of the heating of this evaporation surface 2 and the relative high pressure on this saline side and low pressure in the fresh water tank 7 which causes the vapor to move to a point of expansion, producing droplets of water and vapor at lower pressure. The vapor and droplets are delivered to the fresh water tank 7, just below the surface 6.

The pressure and temperature obtained in the evaporation chamber 17 is separated only by evaporation surface 2 from the increased temperature and pressure in the condensation chamber 11. The heat from the condensation chamber 11 passes through the corrugated evaporation surface 2, and is used to evaporate the saline water delivered to the top of the evaporation surface 2. This vaporization causes increased pressure in the evaporation chamber 17, which passes vapor through the check valve 16, down pipe 13 to the reservoir of fresh water. The condensed vapor beneath the evaporation surface 2 is replaced by new vapor delivered by pump 4 from the fresh water tank 7. The vapor condenses and is eventually returned to the fresh water reservoir through pipe 27. The fresh water drawn into condensation chamber 11 by force of pump 4 also enters tubes 19 connected to pipe 27 for reentry into fresh water reservoir 18. Heat may be added to the system by use of heater 22 to replace heat lost during operation of the system. The addition of heat may take place almost anywhere in the system.

Preferably, the tanks, chambers, conduits and pumps in the system are insulated with insulation 23 to prevent loss of heat during the vaporization process, as evaporation at the evaporation surface 2 depends on pressure differentials, therefore temperature differential. Preferably, this differential is not so great as to cause boiling in the system, because the boiling action entrains salt water droplets in the vapor and is counter productive to the conversion process.

Any flow at the pump 4 will cause a temperature differential at the evaporation surface 2 in relation to the surface 6 in the fresh water tank 7, and will thereby cause some vapor to flow toward and into the fresh water reservoir 18. Preferably, saline water deposited onto the evaporation surface 2 is quite shallow, as to encourage its vaporization. Preferably, this evaporation surface 2 has surrounding it lips 28, sized to hold an optimum volume of water on the evaporation surface. Excess saline water merely overflows the lips 28 and falls into area 3 communicating with chamber 21.

Action of the pump 4, with the inlet 9, causes intake of vapor from the evaporation chamber 17 through the check valve 16 into pipe 13, where it is drawn into the fresh water chamber 18 through nozzles 12 in spider 14, just below the surface 6 of the fresh water reservoir. The spider 14 takes full advantage of the cooled off surface 6 of the fresh water tank 7, and allows more efficient operation.

As the system operates, the temperatures and pressures vary, with only slight loss of heat, easily made up by the heater 22, without causing the liquid to boil. Since inadequate heat and pressure differential at the evaporation surface will not produce adequate vapor, and boiling of the saline water will lift salts and other impurities with the vapor causing these contaminants to enter the fresh water side of the system, a delicate balance of temperature and pressure must be maintained.

Fresh water from the reservoir 18 is withdrawn through conduit 26 at the liquid level 6 of the fresh water tank 7, as desired. Preferably, the fresh water outlet line 26 flows through heat exchanger 35 in the saline supply tank 36 and then through another heat exchanger 37 in a saline waste tank 38, where it is delivered on demand for fresh water by pump 39 through conduit 46.

Saline water overflowing from the system through area 3 of chamber 21 may be flushed away, eliminating impurities accummulated on the saline side of the system through line 24, which communicates with the waste tank 38, where these impurities are removed from the system by pump 30 through waste line 44. Saline water may enter the system through line 47 drawn by pump 29 through heat exchanger 50 in saline waste tank 38 connected to the saline supply tank 36 leading to inlet line 1 through feed valve 49.

The vapor chamber 17 and the fresh water tank 7 are both preferably domed, and each preferably has a bleed valve 51 and 52, respectively, at a suitable point to take off unwanted gas from the system. Suitable float control valves, temperature guages, pressure guages, specific gravity guages and similar instruments may be installed in the system to monitor it and provide specific information for controlling the temperature and pressure differentials necessary to maintain the system, if desired.

In operation, saline water is deposited from saline water inlet line 1 onto the evaporation surface 2, wherein the temperature of the saline water is increased by condensation of vapor in the condensation chamber 11 on its underside. The elevated temperature and pressure in the condensation chamber causes the saline water on the evaporation surface to vaporize, preferably without boiling as to entrain salt products in the vapor, as discussed. Preferably, the temperature differential on the upper and lower surface of the evaporation surface 2 is no more than about 10° C., but this variation can be even less if operations permit. The fact that saline water has a higher boiling point effects the pressure differential.

Pump 4 takes water from just below the surface 6 of the fresh water tank 7. The water from pump 4 passes by the inlet 9, taking with it vapors from the fresh water vapor chamber 8, thus reducing pressure and temperature in the chamber 8 and increasing evaporation at the surface 6 of the fresh water, and further cooling the vapor.

The vapor entrained water stream delivered by pump 4 is forced into the condensation chamber 11, thus increasing the pressure in the condensation chamber, which increases the temperature therein, since compression increases temperature, causing a temperature differential at the evaporation surface 2. Reduced temperature and pressure at outlets 12 assists the flow of vapor in the pipe 13, which flows into the radially positioned nozzles 12 in the spider 14 floating slightly below the liquid surface 6 of the fresh water. Reduced pressure in the pipe 13 allows vapor in the domed chamber 17 to flow through the check valve 16 into the pipe 13 and into the fresh water reservoir 18.

From time to time the saline lines and evaporation surface 2 may be cleansed by admitting cleansing agents into the system, as by opening a valve 53 in the saline inlet line 47, for injecting the cleaner into the system.

A vapor compressor may be substituted in the system for pump 4, preferably at inlet 9, which will compress the vapor drawn from the vapor chamber 8 of tank 7 into the condensation chamber 11.

As described the temperature of saline water is tempered by the fresh water heat exchanger as it enters the system, as well as by the saline effluent, so that the only effective pressure and temperature differential is maintained at the evaporation surface 2, as described. On the underside of the evaporation surface 2 compression of vapor takes place, and on the upper side thereof vaporization or flashing takes place.

While a preferred embodiment of the invention has been shown and described in considerable detail, it should be understood that changes in the specific structure described as well as the steps of the method, can be made without departing from the spirit or scope of the invention. Accordingly, it is not desired that the invention should be limited to the exact apparatus and method steps described.

I claim:

1. In a vapor compression distillation system for desalinating a brine feed, includng an evaporation chamber for evaporating said feed, a condensation chamber in indirect heat exchange contact with said evaporation chamber for providing energy for reboiling said feed, a fresh water tank in direct communication with said condensation chamber for containing a predetermined level of fresh water produced from the condensation of compressed vapor in said condensation chamber, and a vapor pressure differential producing device for compressing vapor from said fresh water tank for transfer to said condensation chamber, the improvement comprising: means for minimizing the work load on said vapor pressure differential producing device, including a conduit having a first end in communication with the interior of said evaporation chamber and a second end in communication with the interior of said fresh water tank, further including means for enabling flow of vapor only from said evaporation chamber to said fresh water tank disposed in said first end, and a spider disposed in second end and positioned just below said predetemined level.

2. The system of claim 1, wherein said vapor pressure differential producing device comprises: A compressor and means providing communication between the suction port of said compressor and the vapor space above said predetermined level.

3. The system of claim 1, wherein said vapor pressure differential producing device comprises: A pump, an ejector, means providing communication between the interior of said fresh water tank just below said predetermined level and the suction port of said pump, means providing communication between the discharge port of said pump and the pressure inlet of said ejector, and means providing communication between the vapor space above said predetermined level and the suction inlet of said ejector.

* * * * *